Nov. 26, 1935.  W. H. DINSPEL  2,022,077
PNEUMATIC DISPATCH APPARATUS
Filed Jan. 19, 1934  2 Sheets-Sheet 1
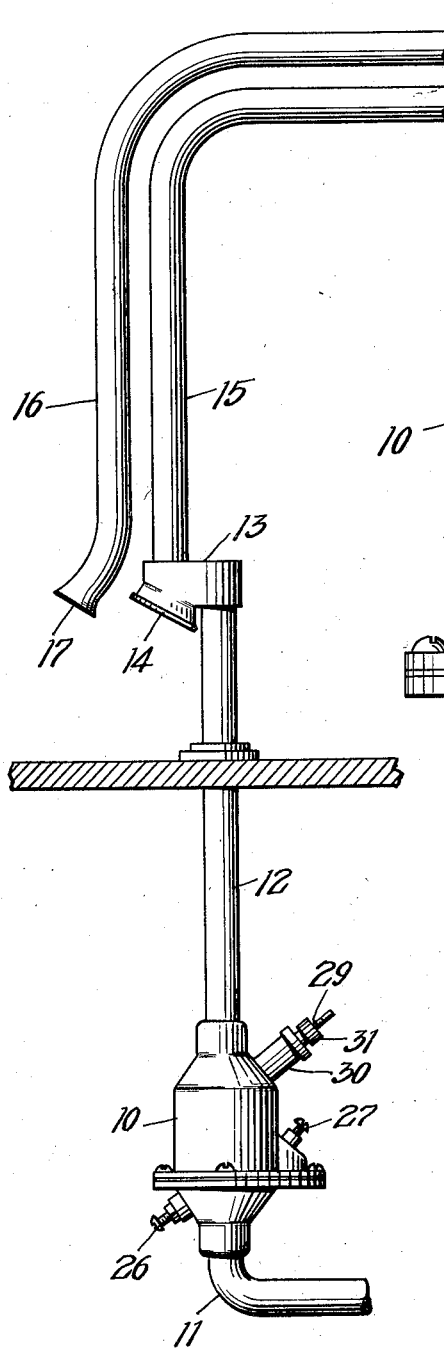
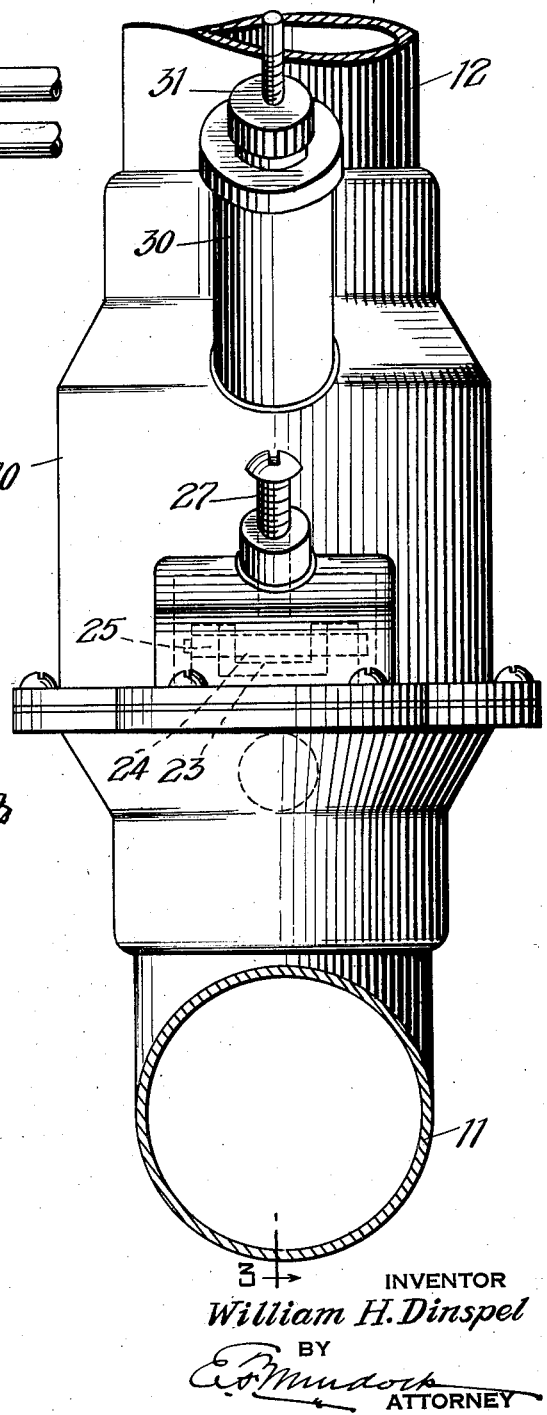
INVENTOR
William H. Dinspel
BY
ATTORNEY

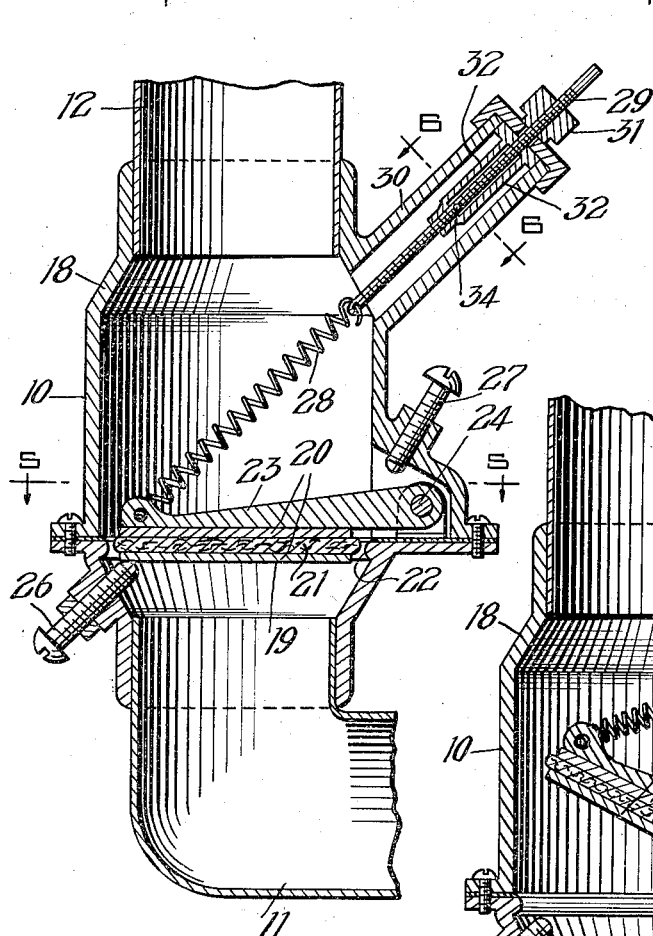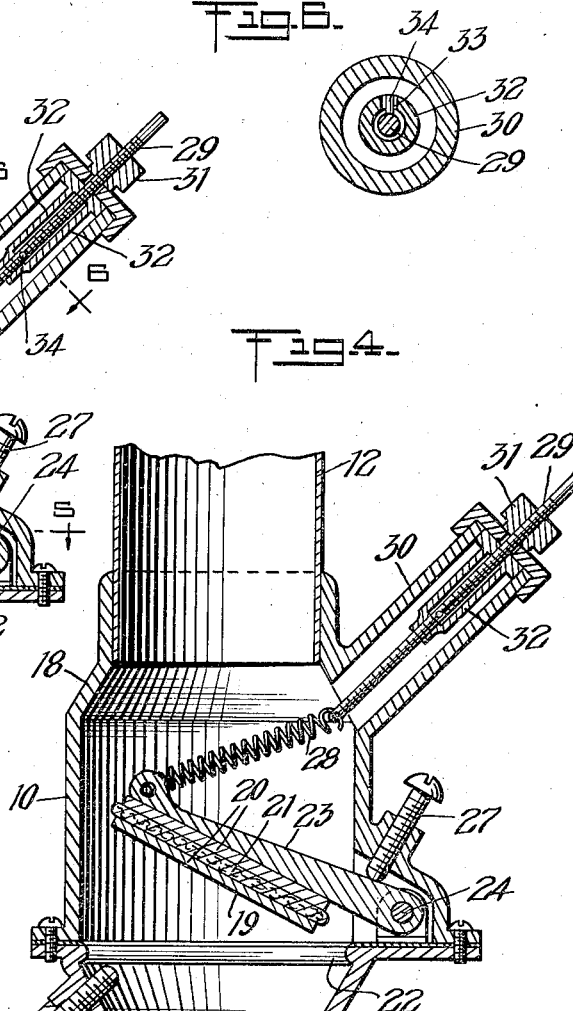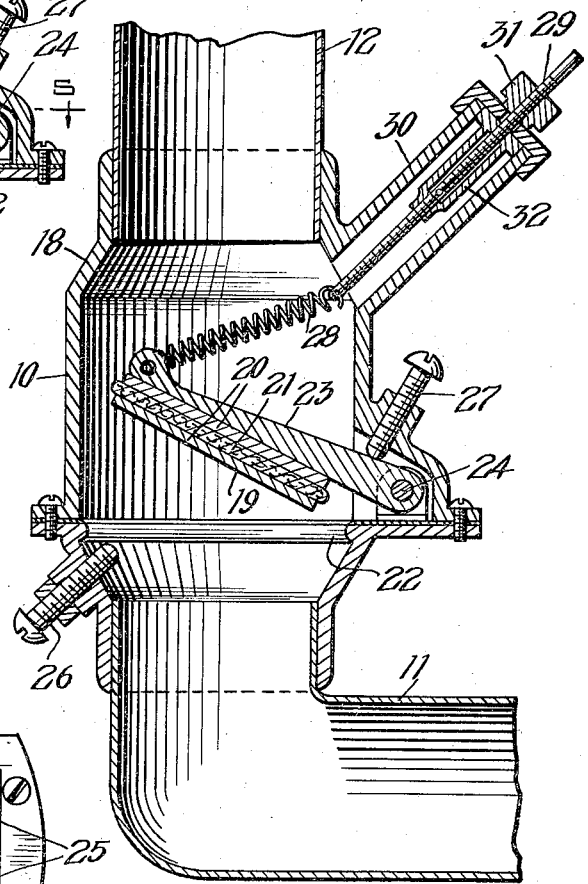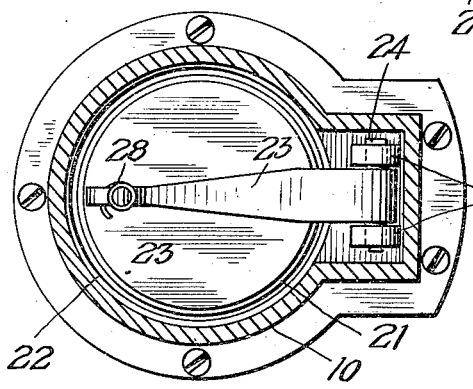

Patented Nov. 26, 1935

2,022,077

UNITED STATES PATENT OFFICE 2,022,077

PNEUMATIC DISPATCH APPARATUS

William H. Dinspel, Bellrose Manor, N. Y.

Application January 19, 1934, Serial No. 707,301

2 Claims. (Cl. 243—4)

This invention relates to improvements in pneumatic dispatch apparatus.

Among the principal objects which the present invention has in view are: to provide an improved damper wherein the flow of air therethrough will be maintained at a minimum flow when said damper is not in use; to provide the damper with a damper gate which will close with minimum noise; to utilize means whereby the damper gate may be regulated from the outside; to provide a damper which is spring-actuated to open position and utilizes pressure differential for closing the damper; to overcome multiplicity of parts heretofore required in dampers of this nature; to secure simplicity of construction and operation.

Drawings

Figure 1 is an elevation of my improved damper shown with the tube connections of a dispatch system;

Figure 2 is another elevation of the said damper looking at the same from the right of Figure 1 and upon a greater scale;

Figures 3 and 4 are sections upon line 3—3 of Figure 2 showing the damper gate in closed and open positions, respectively;

Figures 5 and 6 are sections on lines 5—5 and 6—6 respectively of Figure 3.

Description

As seen in the drawings, a dispatch system is indicated in general in Figure 1 as providing a damper 10 from which leads a tube 11 to the usual exhauster (not shown) and another tube 12 indicative of the service tube or tubes supplying the reduced pressure to a station head 13 having a carrier outlet gate 14 and a transit tube 15. It will be understood that the transit tube 15 is for the return of the carriers (not shown) from a sub-station (not shown) but which tube station is in communication with a transit tube 16 having an open end 17 adjacent the station head 13. The construction and operation of the transit tubes and stations is according to present day practice so that the carrier is inserted into open end 17 of the transit tube 16 for transmitting a carrier to the sub-station, and at the sub-station the carrier is inserted in transit tube 15 for transmitting the carrier to the main station, and when the carrier arrives at either the main or sub-station, it forces upon the spring-closed outlet gate 14 thereby permitting the carrier to fall out on the table after which the gate will close again.

The present invention is directed more particularly to damper 10 by which the exhaust tube 11 is placed in more or less open communication with service tube 12 depending upon whether or not there is a carrier within either of the transit tubes 15 and 16. The damper 10 preferably provides a straight-away passage from end to end within a casing 18 from the ends of the casing wherein the exhauster tube 11 and service tube 12 are mounted. For convenience, the parts will be described in the positions shown in the drawings wherein the exhauster tube 11 is at the bottom of damper casing 18 and service tube 12 is at the top of said casing.

Within casing 18 is a damper gate 19 shown as providing parallel disks 20—20 between which is held a cushioning disk of felt or other suitable material 21. Preferably the cushioning disk projects beyond the other disks and is provided with a rounded edge. Inside of the casing 18 so as to be juxtaposed to the rounded edge of the cushioning disk when the damper gate is closed is an inwardly projecting peripheral bead 22 which is also rounded. The parts are proportioned so as to provide a peripheral space between the cushioning disk and the said bead, thereby not only providing for a so-called "minimum flow" but also avoiding a metallic engagement between these parts when the damper gate closes.

The damper gate shown is preferably hinged by means of an arm 23 extending diametrically across the same and projecting at one side to receive a hinge pin 24 carried by suitable lugs 25 from the casing.

Below the bead 22 opposed to the hinging of the damper gate is an adjustable stop 26 shown as a screw, the head of which is upon the exterior of damper casing 18. The under disk 20 of the damper gate will engage the inner end of the screw and the noise of impact is decidedly lessened by virtue of the cushioning disk 21. The damper gate will be referred to as in closed position when engaging this stop 26. By virtue of the cushioning disk 21 having a rounded projecting edge in proximity to the rounded bead 22, passage of air through the opening therebetween is substantially noiseless.

Open position of the damper is adjustably limited by means of a stop 27 near the hinging of arm 23. This stop likewise is shown as a screw, the head of which is at the exterior of the casing 18, and consequently both stops are readily adjustable.

A spring 28 is provided for normally holding the damper gate 19 in open position against stop 27. This spring 28 is shown as hooked at one end to the end of arm 23 furthest from the hinging thereof, and the other end of the spring is hooked into the inner end of an adjusting screw 29. The adjusting screw preferably extends through a lateral neck 30 projecting diagonally from an upper part of the casing, there being a knurled or other suitable nut 31 outside of the neck upon said screw for obtaining the desired adjustment of the screw. In order to prevent the screw 29 from rotating upon operating nut 31, I have shown an inner stationary sleeve 32 within neck 30, said sleeve slidably receiving screw 29 and having a longitudinal slot 33 for receiving a laterally projecting pin 34 from screw 29. Pin 34 may slide in said slot as the screw advances or retracts, but the screw cannot rotate because of the presence of the pin in the slot. A very accurate adjustment of the screw may be obtained thereby giving a corresponding accurate adjustment of the spring.

In operation the damper gate 19 is normally closed in view of the air pressure admitted by way of opening 17 in the end of tube 16. When a carrier is inserted in opening 17 the pressure within service tube 12 is reduced and thereupon spring 28 functions to open damper gate 19. This damper gate remains open until the carrier is discharged from the transit tube at which time the sudden introduction of pressure and increased flow of air past the damper gate causes the damper gate to close and the differential of pressures on opposite sides of the damper gate then functions to retain the damper gate closed until a carrier is again inserted in either of transit tubes 15, 16. It is to be observed according to my invention, the damper gate 19 constitutes not only a means for deterring flow of the exhausting air when the carrier tubes are in idle condition, but also functions as its own automatic reduction damper for automatically opening and closing according to required conditions existing in the transit tubes.

I claim:

1. In a pneumatic dispatch apparatus, an automatic vacuum damper comprising a casing having a passage therethrough, a damper gate within said casing adapted to substantially close, and when closed providing with the casing a minimum flow passage, and a spring for opening said damper upon decrease of differential of pressure above and below said gate damper, a stop for limiting the closed position of the damper gate, and cushioning means deadening engagement of the damper gate and said stop.

2. In a pneumatic dispatch apparatus having a service tube and means for creating partial vacuum therein, a controlling valve therefor to maintain the service rarefied condition in said tube, said valve embodying a closure member, a resilient support therefor, adjustable means for preventing the complete closure of said member to provide a constant drain on the air content of said service tube, and manually operable means for varying the pull of said support, said means embodying a screw-threaded anchor for said resilient support and an operable nut engaged therewith for drawing the same toward the outer side of the structural mounting of said valve.

WILLIAM H. DINSPEL.